(12) United States Patent
Hattori et al.

(10) Patent No.: US 7,948,138 B2
(45) Date of Patent: May 24, 2011

(54) ROTOR

(75) Inventors: Hiroyuki Hattori, Toyota (JP); Akihide Takehara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 337 days.

(21) Appl. No.: 11/918,448

(22) PCT Filed: Nov. 17, 2005

(86) PCT No.: PCT/JP2005/021506
§ 371 (c)(1),
(2), (4) Date: Oct. 15, 2007

(87) PCT Pub. No.: WO2006/117891
PCT Pub. Date: Nov. 9, 2006

(65) Prior Publication Data
US 2009/0079287 A1    Mar. 26, 2009

(30) Foreign Application Priority Data

Apr. 28, 2005  (JP) .................................. 2005-132408

(51) Int. Cl.
*H02K 21/12* (2006.01)
*H02K 1/22* (2006.01)

(52) U.S. Cl. ......... 310/156.53; 310/156.01; 310/156.21; 310/156.54; 310/156.55; 310/156.56; 310/261.1

(58) Field of Classification Search ............. 310/156.53, 310/156.56, 156.21, 156.23, 156.31, 156.01, 310/156.54–156.55, 261.1
See application file for complete search history.

(56) References Cited

U.S. PATENT DOCUMENTS

| 5,159,220 A | * | 10/1992 | Kliman ..................... 310/156.56 |
| 6,353,275 B1 | * | 3/2002 | Nishiyama et al. ...... 310/156.53 |
| 6,891,298 B2 | | 5/2005 | Gary |
| 7,262,526 B2 | | 8/2007 | Shiga et al. |

FOREIGN PATENT DOCUMENTS

| EP | 1 536 543 A | 6/2005 |
| JP | 09-294344 A | 11/1997 |
| JP | 11-098735 A | 4/1999 |
| JP | 2001-352702 A | 12/2001 |
| JP | 2002-136008 A | 5/2002 |
| JP | 2004-104962 A | 4/2004 |
| JP | 2004254466 A * | 9/2004 |
| JP | 2005012859 A * | 1/2005 |
| JP | 2005-051982 A | 2/2005 |
| JP | 2005-086955 A | 3/2005 |

OTHER PUBLICATIONS

Machine Translation JP2005012859 (2005) and JP2004254466 (2004).*

* cited by examiner

*Primary Examiner* — Quyen Leung
*Assistant Examiner* — Jose A Gonzalez Quinones
(74) *Attorney, Agent, or Firm* — Kenyon & Kenyon LLP (57) ABSTRACT

A rotor is provided with a rotor core, a magnet inserted into the rotor core and a filling portion arranged in a space between the rotor core and the magnet. The space between the rotor core and a radially outer side surface of the magnet has a uniform width in a central portion (portion (A)) with respect to a width direction (of arrow (DR4)) of the magnet. A width of the space in an end portion (portion (B)) with respect to the width direction (of arrow (DR4)) of the magnet is larger than that of the space in the portion (A).

4 Claims, 6 Drawing Sheets

ROTOR

This is a 371 national phase application of PCT/JP2005/021506 filed 17 Nov. 2005, which claims priority of Japanese Patent Application No. 2005-132408 filed 28 Apr. 2005, the contents of which are incorporated herein by reference.

TECHNICAL FIELD

The present invention relates to a rotor, and particularly to a rotor having magnets inserted into a rotor core.

BACKGROUND ART

A rotor having magnets inserted into a rotor core has been known.

For example, Japanese Patent Laying-Open No. 2004-104962 has disclosed a rotating electric machine provided with a rotor including a pair of magnet insertion holes spaced from each other by an opposition distance that gradually increases as the position moves toward an outer periphery of a rotor core, and also including permanent magnets fixedly inserted into the magnet insertion holes, respectively.

Japanese Patent Laying-Open No. 2001-352702 has disclosed a rotating electric machine, in which a permanent magnet inserted into a rotor is supported at three points by an inner wall surface of a magnet insertion hole on a plane perpendicular to the insertion direction of the permanent magnet.

However, in the rotating electric machine disclosed in Japanese Patent Laying-Open No. 2004-104962, a space between the magnet and the rotor core is not sufficiently filled with an adhesive in some cases. This results in increase of a stress that locally occurs in the rotor core.

In the rotating electric machine disclosed in Japanese Patent Laying-Open No. 2001-352702, a widthwise central portion of the magnet is supported on a radially outer side of the rotor core by the rotor core. Therefore, a stress occurring in the rotor core increases in this supporting portion.

DISCLOSURE OF THE INVENTION

An object of the present invention is to provide a rotor that suppresses occurrence of a local and excessive stress in a rotor core.

A rotor according to the present invention includes a rotor core fixed to a rotary shaft and having an axially extending hole, a magnet inserted into the hole, and a filling portion arranged in a space between the rotor core and the magnet. On an axial cross section of the rotor core, the space is formed between the rotor core and a radially outer side surface of the magnet in a widthwise central portion of the magnet, and the space in a widthwise end portion of the magnet has a portion wider than the space in the widthwise central portion of the magnet.

According to the above structure, since the space in the widthwise end portion of the magnet has a large width, the filling material can easily enter the wide portion so that the magnet can be stably fixed throughout the axial length of the rotor core. Since the space is formed between the magnet and the rotor core in the widthwise central portion of the magnet, it is possible to suppress the contact between the rotor core and the magnet near the widthwise central portion of the magnet. Consequently, it is possible to suppress a local and excessive stress in the rotor core.

Preferably, in the above rotor, the space in the widthwise central portion of the magnet has a uniform width.

This structure can suppress local contact between the rotor core and the magnet within a narrow range near the widthwise central portion of the magnet. Consequently, it is possible to increase the effect of suppressing the occurrence of the local and excessive stress in the rotor core.

The "radially outer side surface" means a "magnetic surface" of the magnet located on the radially outer side the rotor core. The "filling portion" is a "joining portion" that is formed in the space between the rotor core and the magnet, and joins them together. It is not necessarily the case that the "filling portion" is distributed on a whole circumference of the magnet. The "width of the space" means the width of the space between the rotor core and the magnet that is inserted at a predetermined angle. Therefore, even in the case where the magnet is inserted into the rotor core at an angle shifted from the predetermined angle, and thereby a space of an irregular width is formed between the rotor core and the magnet in the widthwise central portion of the magnet, this case is included in the case of the "uniform width of the space" provided that the width of the space is uniform when the magnet is inserted at the predetermined angle that is intended in advance. Even in this case, the foregoing structure can suppress the local contact in a narrow range between the rotor core and the magnet near the widthwise central portion of the magnet, and therefore can likewise suppress the occurrence of the local and excessive stress in the rotor core.

Preferably, the rotor is provided with a pair of the magnets such that an opposing distance between radially outer side surfaces of the magnets increases as the position moves radially outward in the rotor core.

By employing the above substantially V-shaped arrangement, it is possible to reduce a width of each magnet and thereby to reduce further the stress occurring in the rotor core. Further, a density of magnetic flux directed from the rotor to the stator can be increased.

Preferably, in the above rotor, the width of the space in the widthwise end portion of the magnet located in a radially outer position of the rotor core is larger than the width of the space in the widthwise end portion of the magnet located in a radially inner position of the rotor core.

Since the space in the radially outer position where an eddy-current loss becomes larger has a large width, the above structure can suppress the eddy-current loss while suppressing lowering of a torque.

Preferably, the rotor has a portion where a flux barrier of the magnet overlaps in the radial direction of the rotor core with a radially outer side surface of the magnet.

According to the above structure, since the hole defining the outer periphery of the flux barrier can have a large curvature radius, it is possible to relieve stress concentration at a bridge portion located radially outside the flux barrier.

The "flux barrier" in this description means a space that is formed between the magnet and the rotor core and is primarily opposed to the widthwise end surface of the magnet, and particularly means a portion that suppresses rounding of the flux from the radially outer side surface toward the rear surface.

As described above, the present invention can suppress occurrence of a local and excessive stress in the rotor core.

BEST MODES FOR CARRYING OUT THE INVENTION

Embodiments of a rotor according to the present invention will now be described. The same or corresponding portions bear the same reference numbers, and description thereof may not be repeated.

Figure 1:
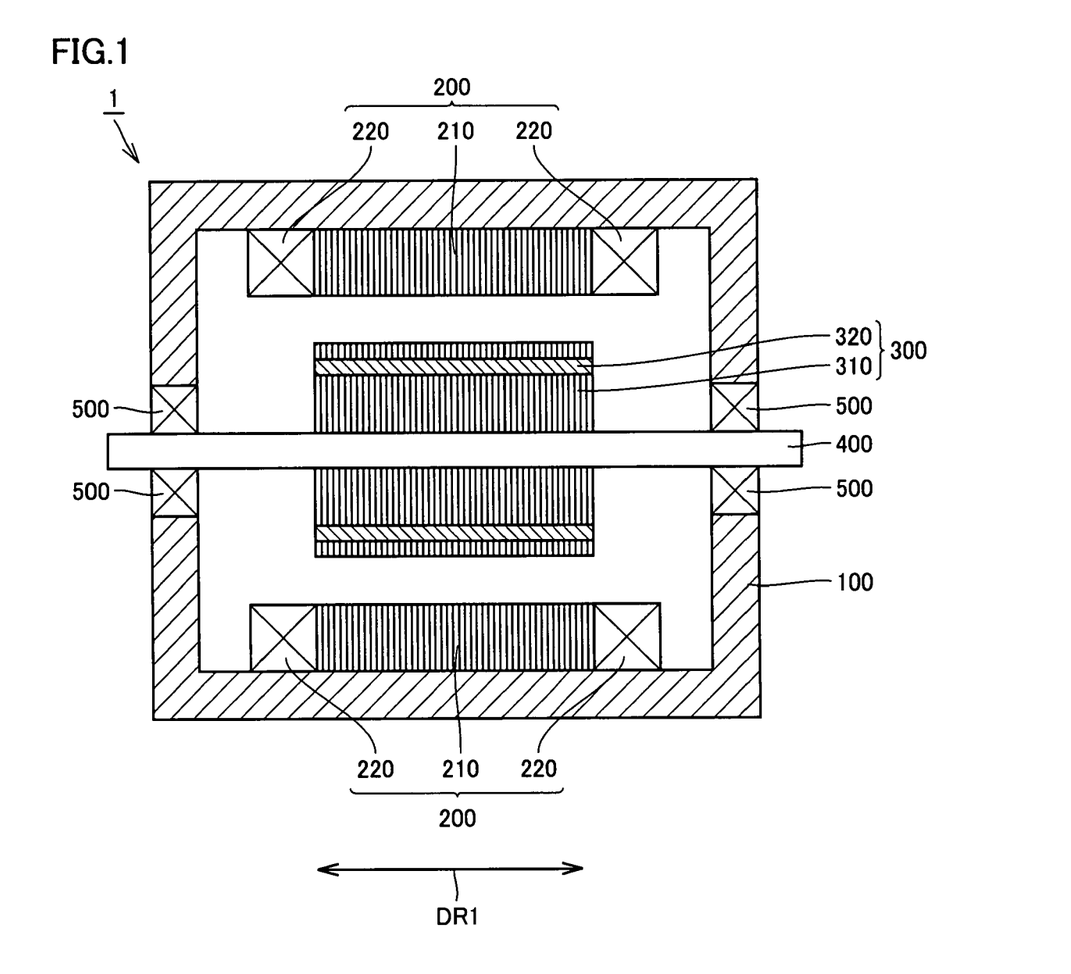
FIG. 1 is a cross section showing a rotating electric machine including a rotor according to an embodiment of the invention.

FIG. 1 is a cross section showing a rotating electric machine including a rotor according to an embodiment of the present invention. Referring to FIG. 1, a rotating electric machine 1 that is a motor and/or a generator includes a stator 200 arranged in a housing 100 having a stator-accommodating portion, a rotor 300, a rotary shaft 400 and bearings 500.

Stator 200 has an annular stator core 210 and a stator coil 220. Stator core 210 consists of plate-like members which is formed of a magnetic material such as iron or iron alloy. Stator core 210 is provided on its inner peripheral surface with a plurality of teeth (not shown) and slots (not shown) that are concavities formed between the teeth. The slots open on the inner peripheral side of stator core 210.

Stator coil 220 includes three winding phases, i.e., U-, V- and W-phases. Stator coil 220 is formed around teeth and is fitted in the slots. The windings of U-, V- and W-phases are shifted from each other on the circumference.

Rotor 300 has a rotor core 310 fixed to rotary shaft 400, and magnets 320 embedded in rotor core 310. Rotor core 310 is formed of a magnetic material such as iron or iron alloy. For example, magnets 320 are arranged near the outer periphery of rotor core 310, and are spaced substantially equally from each other.

Rotary shaft 400 is rotatably attached to housing 100 via bearings 500.

Figure 2:
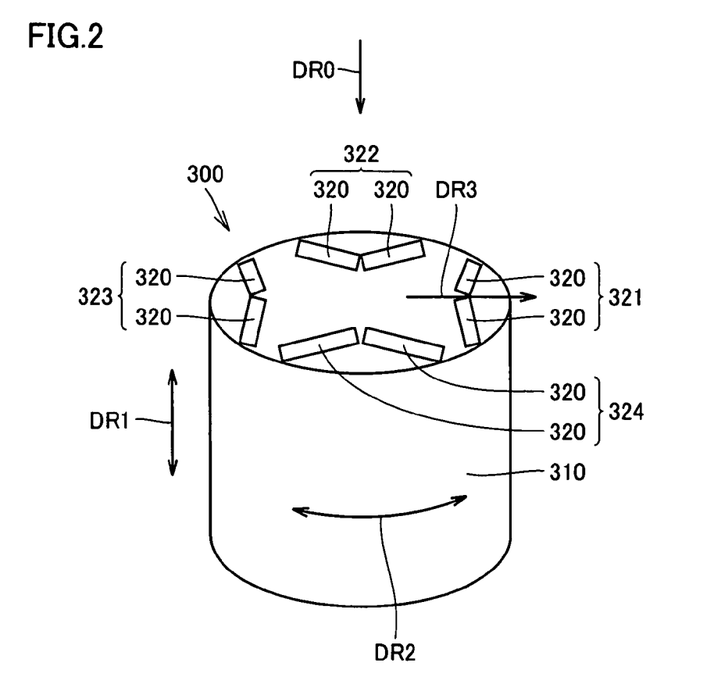
FIG. 2 is a perspective view showing the rotor in the rotating electric machine shown in FIG. 1.

FIG. 2 is a perspective view showing rotor 300 in the rotating electric machine shown in FIG. 1. Referring to FIG. 2, rotor core 310 has holes that extend axially (i.e., in a direction of an arrow DR1), and magnets 320 are inserted into these holes, respectively. The plurality of magnets 320 are aligned to each other in the circumferential direction (i.e., the direction of an arrow DR2) of rotor core 310. Magnets 320 form magnet pairs 321-324 each configured such that radially outer side surfaces of magnets 320 are spaced from each other by an opposition distance which increases as the position moves radially outward (i.e., in a direction of an arrow DR3) in rotor core 310. By employing this substantially V-shaped arrangement, the width of each magnetic can be reduced, and a stress occurring in the rotor core can be reduced. Further, a magnetic flux density directed from rotor 300 toward stator 200 can be increased.

Figure 3:
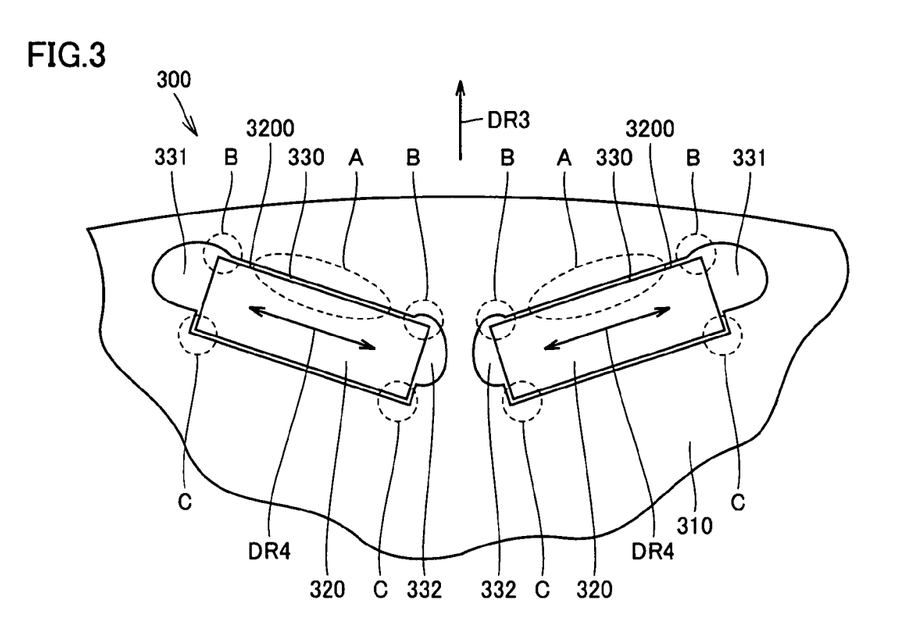
FIG. 3 is an enlarged top view of the rotor shown in FIG. 2 viewed in a direction of an arrow DR0.

FIG. 3 is an enlarged top view of the rotor shown in FIG. 2 viewed in a direction of an arrow DR0. Referring to FIG. 3, a space 330 is formed between rotor core 310 and magnet 320. The shape of space 330 shown in FIG. 3 is substantially uniform throughout the axial length (in the direction of arrow DR1) of rotor core 310. A joining layer made of an adhesive or injection resin is arranged in space 330. Thereby, magnet 320 is fixed to rotor core 310. The joining layer forms a "filling portion" arranged in the space between rotor core 310 and magnet 320. Magnet 320 inserted into the hole of rotor core 310 was slightly rotated when it was inserted into rotor core 310, and the direction of such insertion is defined substantially uniquely by direction defining portions C.

As shown in FIG. 3, space 330 is formed between rotor core 310 and radially outer side surface 3200 of the magnet 320 in a widthwise central portion (a portion A in a width direction indicated by an arrow DR4) of magnet 320. In portion A, space 330 has a uniform width. In a widthwise end portion (a portion B with respect to the width direction of arrow DR4) of magnet 320, space 330 has a larger width than that in portion A. Thus, the side surface of the magnet insertion hole formed in rotor core 310 is provided at the widthwise end portion of magnet 320 with an "escaping portion" in which the side surface is largely spaced from radially outer side surface 3200 of the magnet. A flux barrier 331 or 332 is formed and opposed to each widthwise end surface (i.e., an end surface in the widthwise end) of magnet 320. Flux barriers 331 and 332 form portions of space 330. Flux barriers 331 and 332 suppress rounding of the magnetic flux from radially outer side surface 3200 toward the rear surface (i.e., a radially inner side surface).

Further, as shown in FIG. 3, the "escaping portions" are formed in the central portion (a valley of the V-shape) of the V-shaped arrangement of magnets 320. Thereby, rounded portions relieving the stress concentration are formed in rotor core 310. Therefore, magnet 320 can be located closer to the center (i.e., the valley of the V-shape) of the magnetic pole. Thus, magnet 320 can be arranged more flexibly, and the performance of the rotating electric machine is improved.

In a process of producing rotor 300, electromagnetic steel plates having holes are layered to form rotor core 310 having the holes for magnet insertion. An adhesive is applied into the holes, and then magnets 320 are inserted into the respective holes. Alternatively, the adhesive may be applied into space 330 after inserting magnets 320 into the respective holes. In any case, the adhesive reliably flows through flux barriers 331 and 332 toward wide portions of space 330 in the widthwise ends (portions B) of magnet 320. Rotor core 310 may be formed of a powder magnetic core.

Figure 4:
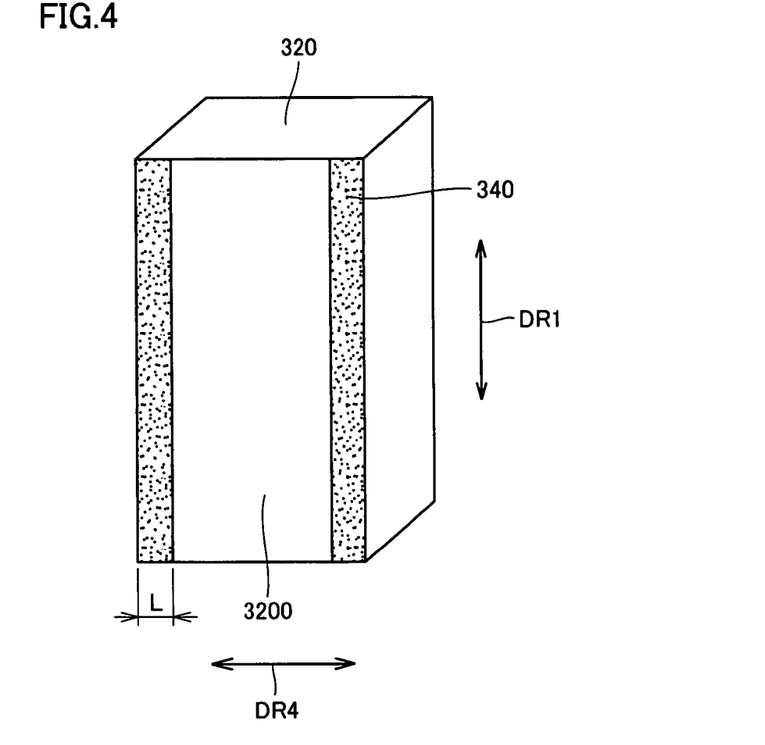
FIG. 4 is a perspective view showing a magnet included in the rotor shown in FIGS. 2 and 3.

FIG. 4 is a perspective view showing magnet 320 inserted into rotor core 310. As described above, the width of space 330 is increased in the widthwise ends (portions B) of magnet 320, and thereby an adhesive 340 can easily move from flux barriers 331 and 332 into space 330 at portions B. Consequently, as shown in FIG. 4, adhesive 340 flows around magnet 320 at the widthwise ends (i.e., ends with respect to the width direction of arrow DR4) of magnet 320, and extends throughout the axial length (in the direction of arrow DR1) of magnet 320. In this example, adhesive 340 is distributed throughout the axial length (in the direction of arrow DR1) of rotor core 310 at the widthwise opposite end portions (i.e., end portions with respect to the width direction of arrow DR4) of magnet 320.

Figure 7:
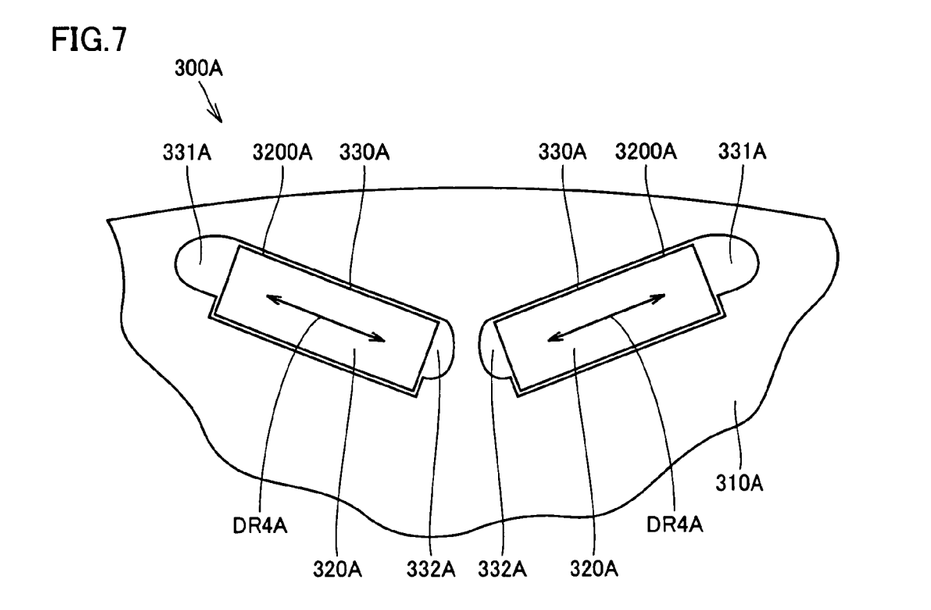
FIG. 7 is an enlarged top view showing a rotor for comparison with the rotor shown in FIGS. 2 and 3.

FIG. 7 is an enlarged top view showing a rotor 300A for comparison with rotor 300 shown in FIGS. 2 and 3. Referring to FIG. 7, rotor 300A basically has a structure similar to that of rotor 300 shown in FIGS. 2 and 3. More specifically, rotor 300A has a rotor core 310A and a magnet 320A, and a space 330A is formed between rotor core 310A and a radially outer side surface 3200A of magnet 320A. Flux barriers 331A and 332A are formed and opposed to widthwise opposite ends (i.e., ends with respect to the width direction of an arrow DR4A) of magnet 320A, respectively. In rotor 300A, however, space 330A between rotor core 310A and a radially outer side surface 3200A of magnet 320A has a width that is substantially uniform throughout the width in the direction of arrow DR4A of magnet 320A. When the width of space 330A is reduced for improving magnetic properties of rotating electric machine, the adhesive may not turn and extend sufficiently in space 330A. If it were intended to turn and extend the adhesive sufficiently in such a space, this would complicate the control of a temperature, a width of the space and a work position, resulting in low working properties.

Figure 8:
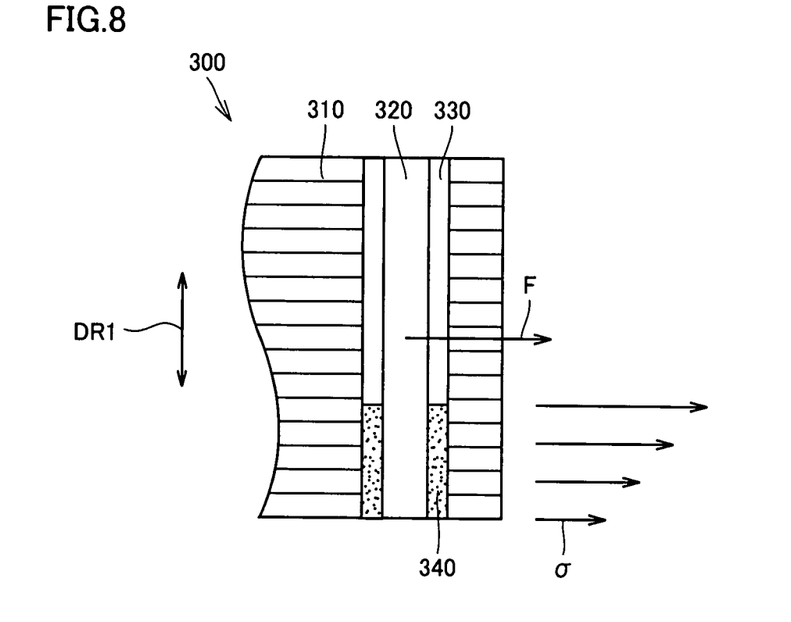
FIG. 8 is a diagram (diagram 1) illustrating a relationship between the filling state of the adhesive and the stress occurring in the rotor core.
Figure 9:
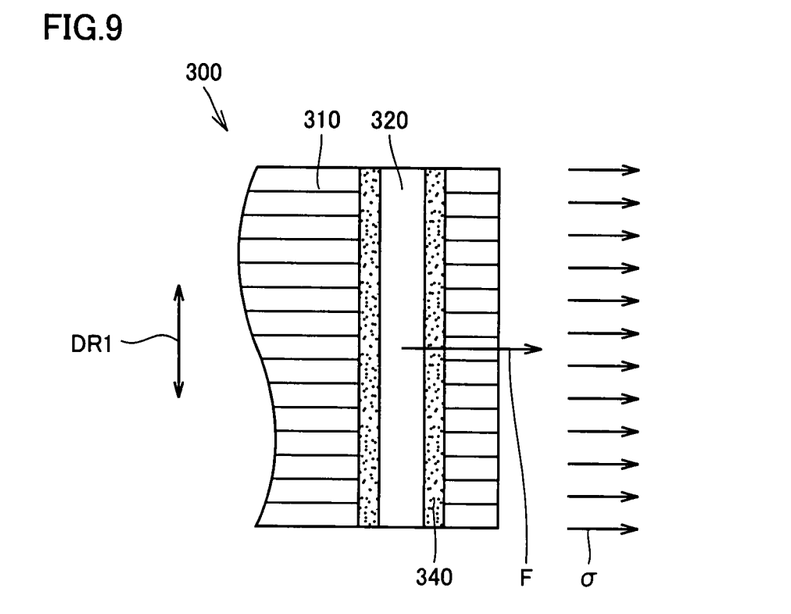
FIG. 9 is a diagram (diagram 2) illustrating the relationship between the filling state of the adhesive and the stress occurring in the rotor core.

FIGS. 8 and 9 illustrate a relationship between a filling situation of adhesive 340 joining rotor core 310 and magnet 320 together and a stress occurring in rotor core 310. Referring to FIGS. 8 and 9, a centrifugal force F that acts on magnet 320 during rotation of rotor 300 is transmitted to rotor core 310 via adhesive 340. In rotor 300 shown in FIG. 8, adhesive 340 does not sufficiently turn and extend in the axial direction indicated by arrow DR1 of magnet 320 so that a relatively large stress σ occurs locally in one or some of the electromagnetic steel plates of rotor core 310. Conversely, in rotor 300 shown in FIG. 9, adhesive 340 turns and extends throughout the axial length (in the direction of arrow DR1) of magnet 320 so that the force acting on rotor core 310 is uniformly distributed. This distribution suppresses occurrence of excessive stress σ in one or some of the electromagnetic steel plates.

Figure 5:
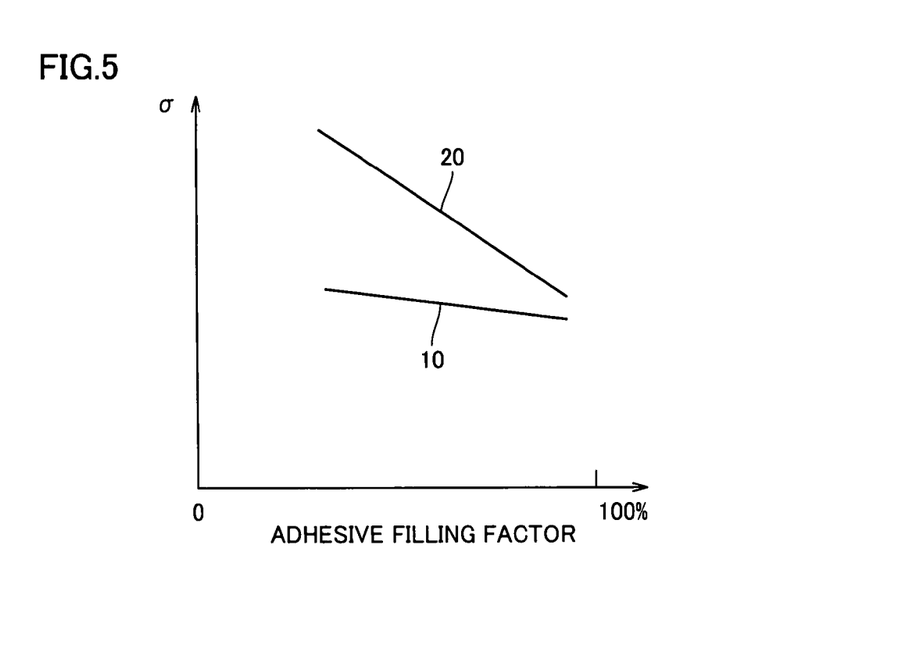
FIG. 5 illustrates a relationship between an adhesive filling factor and a stress occurring in a rotor core.

FIG. 5 illustrates a relationship between an adhesive filling factor and a stress (maximum stress) occurring in the rotor core. In FIG. 5, line 10 represents the above relationship relating to rotor 300A shown in FIG. 7, and line 20 represents the above relationship relating to rotor 300 shown in FIGS. 2 and 3. Referring to FIG. 5, as the adhesive filling factor lowers in rotor 300A (line 10), stress σ occurring in rotor core 310 increases. Conversely, in rotor 300 (line 20), even when the adhesive filling factor lowers (i.e., "L" in FIG. 4 decreases), adhesive 340 is distributed throughout the axial length (in the direction of arrow DR1) of magnet 320, and this suppresses excessive increase of stress σ occurring in rotor core 310.

Referring again to FIG. 3, space 330 in rotor 300 according to this embodiment is substantially uniform in the widthwise central portion (portion A) of magnet 320. Thereby, even when radially outer side surface 3200 of magnet 320 is in direct contact with rotor core 310 without interposing adhesive 340, it is possible to suppress the contact of rotor core 310 with magnet 320 through a locally narrow range near portion A. Therefore, such a situation is suppressed that an excessive stress occurs near portion A in rotor core 310.

Figure 6:
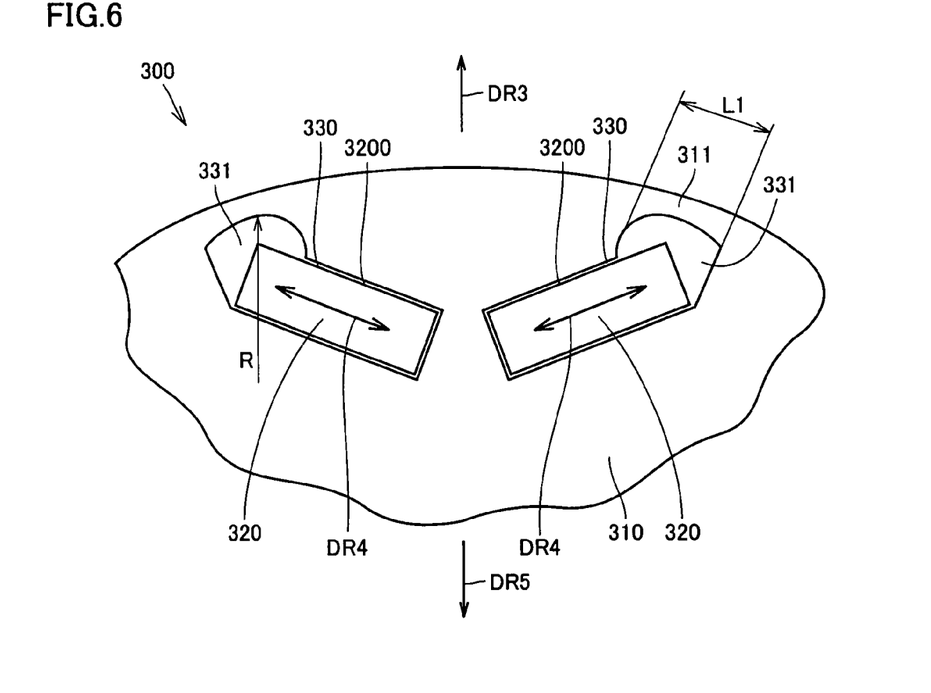
FIG. 6 is an enlarged top view showing a modification of the rotor according to an embodiment of the invention.

FIG. 6 shows a modification of rotor 300. In this modification, the "escaping portion" is formed only on the outer side of the substantially V-shaped arrangement. Thus, in the widthwise end portion of the magnet, space 330 on the radially outer side (indicated by arrow DR3) of rotor core 310 has the width larger than that of space 330 on the radially inner side (indicated by an arrow DR5) of rotor core 310.

In the rotating electric machine, it is important to reduce the eddy-current loss of magnet 320. It can be considered to reduce the eddy-current loss by temporarily dividing the magnet and thereby increasing the resistance of the magnet. However, this manner requires process of restoring the divided magnet pieces, resulting in increase in cost. In general, the eddy-current loss of magnet 320 is relatively large at radially outer corners. However, rotor 300 according to this modification has space 330 of the increase width on the radially outer side where a large eddy-current loss may occur, and therefore the eddy-current loss can be effectively suppressed. In the modification, portions of space 330 other than the above have a relatively small width for suppressing the excessive torque lowering of the rotating electric machine.

Further, rotor 300 according to this modification differs from rotor 300 shown in FIG. 3 in that space 330 has a relatively large width in the widthwise end portion of the magnet on the radially outer side (indicated by arrow DR3) of rotor core 310. Therefore, space 330 in this portion effectively functions also as the flux barrier. In other words, rotor 300 shown in FIG. 6 has a portion where flux barrier 331 of magnet 320 overlaps in the radial direction of rotor core 310 with radially outer side surface 3200 of magnet 320.

In this modification, rotor core 310 has a bridge portion 311 of a relatively large length (L1). Consequently, a curvature radius (R) of bridge portion 311 can be large, and stress concentration at bridge portion 311 can be relieved.

According to rotor 300 of this embodiment, as described above, the occurrence of the local and excessive stress in rotor core 310 is suppressed. Therefore, the reliability in rotor strength is improved. In other words, since the bridge portion in the rotor core can have a small width, it is possible to achieve reduction in size, increase in performance and reduction in cost of the rotating electric machine.

This embodiment has been described based on the assumption that magnet 320 is inserted into rotor core 310 in the intended insertion direction owing to the operation of direction defining portions C (FIG. 3). However, even when magnet 320 is inserted into rotor core 310 in a direction different from the intended insertion direction, rotor 300 according to the present embodiment can avoid at least such a situation that local contact in a narrow range occurs between rotor core 310 and magnet 320 near the widthwise central portion (portion A) of magnet 320. Therefore, occurrence of the local and excessive stress in rotor core 310 is suppressed near portion A.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The invention can be applied, e.g., to a rotor of a rotating electric machine mounted on a hybrid vehicle.

The invention claimed is:
1. A rotor comprising:
   a rotor core fixed to a rotary shaft and having an axially extending hole;
   a magnet inserted into said hole; and
   a filling portion arranged in a space between said rotor core and said magnet,
   wherein on an axial cross section of said rotor core, the space is formed between said rotor core and a radially outer side surface of said magnet in a widthwise central portion of said magnet, and said space in a widthwise end portion of said magnet has a portion wider than said space in the widthwise central portion of said magnet with increased width on the radially outer side,
   wherein the axially extending hole has two direction defining portions formed at two widthwise radially inner end corners of the hole to uniquely define a direction for the magnet to be inserted into the hole,
   wherein a pair of said magnets are arranged such that an opposing distance between radially outer side surfaces of said magnets increases as the position moves radially outward in said rotor core, such that said pair of said magnets forms a substantially V-shaped arrangement, wherein said portion wider than said space in the widthwise central portion of said magnet is formed in a valley of said V-shaped arrangement of said pair of said magnets, the rotor further comprising a flux barrier, which is a portion of the space between the rotor core and the magnet, the flux barrier being formed and opposed to the widthwise end surface of the magnet and suppressing rounding of the magnetic flux from the radially outer side surface of the magnet toward the radially inner side surface of the magnet, and wherein the side surface of a hole defining the outer periphery of the flux barrier is continuously connected to an escaping portion in which the side surface of said axially extending hole is largely spaced from the radially outer side surface of said magnet to form a rounded portion relieving the stress concentration in the rotor core.

2. The rotor according to claim 1, wherein
said space in the widthwise central portion of said magnet has a uniform width.

3. The rotor according to claim 1, wherein
the width of said space in the widthwise end portion of said magnet located in a radially outer position of said rotor core is larger than the width of said space in the widthwise end portion of said magnet located in a radially inner position of said rotor core.

4. The rotor according to claim 1, wherein
said rotor has a portion where a flux barrier of said magnet overlaps in a radial direction of said rotor core with a radially outer side surface of said magnet.

* * * * *

UNITED STATES PATENT AND TRADEMARK OFFICE
CERTIFICATE OF CORRECTION

| | | |
|---|---|---|
| PATENT NO. | : 7,948,138 B2 | Page 1 of 1 |
| APPLICATION NO. | : 11/918448 | |
| DATED | : May 24, 2011 | |
| INVENTOR(S) | : Hiroyuki Hattori et al. | |

It is certified that error appears in the above-identified patent and that said Letters Patent is hereby corrected as shown below:

| Column | Line | |
|---|---|---|
| 3 | 62 | Change "magnetic" to --magnet--. |

Signed and Sealed this

Eighteenth Day of October, 2011

David J. Kappos
*Director of the United States Patent and Trademark Office*